United States Patent Office 3,389,285
Patented June 18, 1968

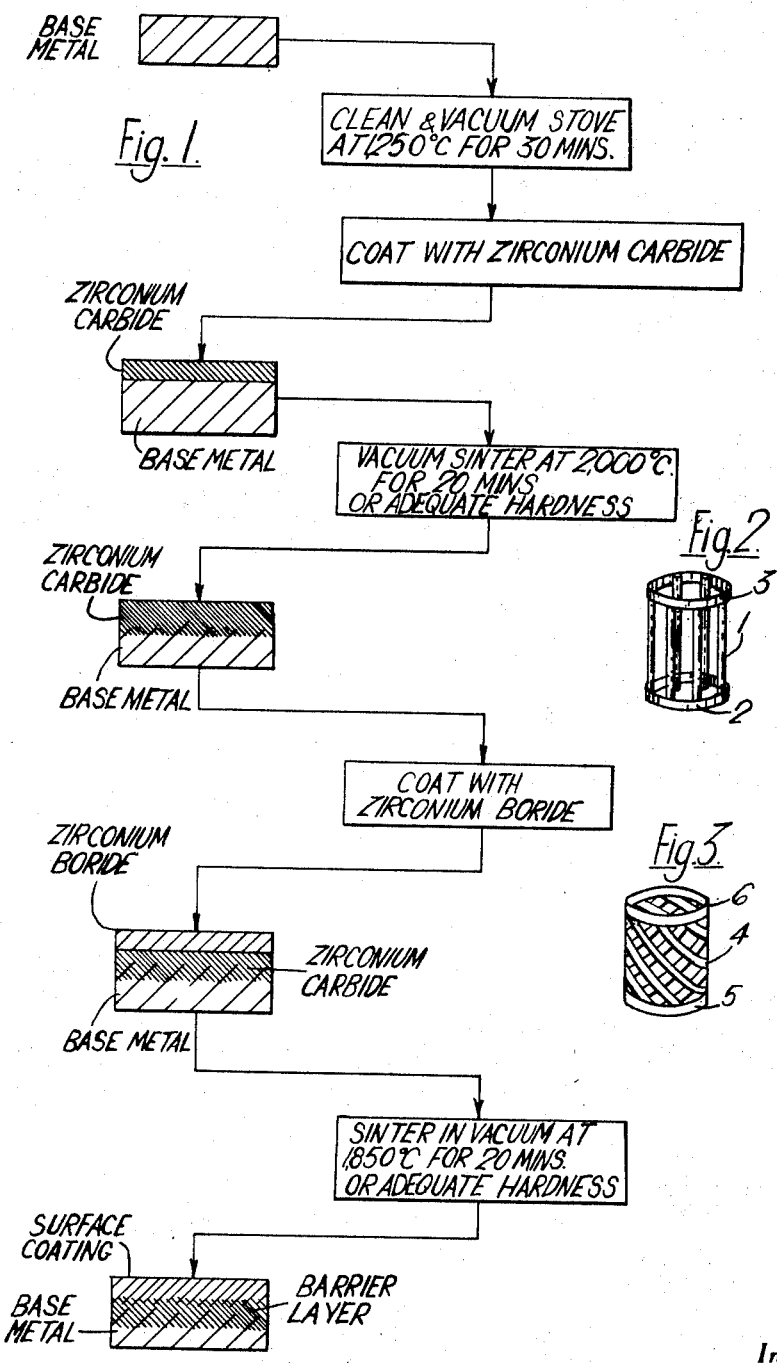

3,389,285
GRID ELECTRODE HAVING A BARRIER LAYER OF METAL CARBIDE AND A SURFACE COATING OF METAL BORIDE THEREON
Bernard Thomson, Plumstead, Capetown, Cape Province, South Africa, assignor to International Standard Electric Corporation, New York, N.Y., a corporation of Delaware
Filed Aug. 26, 1965, Ser. No. 482,757
Claims priority, application Great Britain, Sept. 8, 1964, 36,742/64
7 Claims. (Cl. 313—107)

ABSTRACT OF THE DISCLOSURE

A barrier layer of a metal carbide such as zirconium carbide and a surface coating of a metal boride such as zirconium boride are employed on a refractory metal base to suppress grid emission in an electron tube.

---

The invention relates to grids for thermionic valves and is particularly concerned with means for obtaining a low value of grid emission in a valve.

Of the many types of coatings which it has been previously proposed to use for the reduction of grid emission, one of the most effective is zirconium boride. Unfortunately, however, such a coating on the normal metal used for grid construction—molybdenum, tungsten, tantalum—is found to react with the base metal and cause distortion or embrittlement of the grid together with deterioration in the grid emission suppression properties of the boride. This has been recognised and it has been suggested that platinum be used as a barrier layer under the surface coating of zirconium boride. I find that the use of platinum is unsatisfactory because of undesirable reaction between the base metal and platinum.

According to the present invention there is provided a grid for a thermionic valve made from a metal base covered with a barrier layer of a metal carbide which does not react with or diffuse into the base and a surface coating of a metal boride having a low thermionic emission and being such that does not diffuse through the barrier layer during operation of the valve.

The invention also provides a method of manufacture for a grid of a thermionic valve wherein there is applied to a refractory metal base a first coating of a mixture or a compound of carbon and a refractory metal or compound of the refractory metal, a second coating of a mixture or a compound of boron and a refractory metal is applied over first coating and the coatings are sintered to bond them mechanically one to another and to the metal base.

Although, at the present time, I prefer to use zirconium carbide as the barrier layer and zirconium boride for the surface layer, with molybdenum or tantalum as the base metal, carbides, and borides of other metals may be used for the two layers, as will be discussed below, while other base metals are also suitable.

The invention will be further described with reference to the accompanying drawings in which:

FIG. 1 is a flow diagram for a preferred method of manufacture according to the invention, and FIGS. 2 and 3 illustrate typical kinds of grid to which the invention is applicable.

In the manufacture of a grid according to the present invention, the grid is first fabricated to the desired configuration such as a squirrel cage grid illustrated diagrammatically in FIG. 2 or a mesh grid as illustrated in FIG. 3. In the squirrel cage grid of FIG. 2 the bars 1 will normally be of molybdenum secured in position by end rings 2 and 3 of the same metal. In the mesh construction FIG. 3 either tapes 4 of tantalum are welded to sheet metal tantalum end rings 5 and 6 and are also welded to one another at the cross-overs of the tapes, or the grid may be fabricated from tantalum sheet metal in the form of expanded metal, for example, or the mesh pattern may be produced by a photo-etching technique. After cleaning, the grids are vacuum stoved at 1250° C. for about 30 minutes according to our present schedules. After stoving the grid is coated with zirconium carbide by spraying, dipping or other conventional means, using a suspension of zirconium carbide in an organic binder. I use zirconium carbide because it is commercially conveniently available as such, but a mixture of zirconium and carbon or compounds of these which will react together to form zirconium carbide in the subsequent firing process may also be used. After coating, the grid is sintered in vacuum until an adequate hardness of coating is achieved; this matter of adequate hardness will be discussed below. The thickness of carbide should be such as to protect the base metal against contact with the boride and for this purpose present indications are that the thickness should be not less than 25 microns and the carbide layer should be as dense as possible.

After the barrier layer has been sintered on to the base metal, the grid is coated with zirconium boride, using either commercially available zirconium boride in a carrier medium or zirconium and boron or compounds of these which will form zirconium boride during the subsequent sintering operation. The grid is then fired in vacuum at 1850° C. for about 20 minutes to sinter the boride coating to the carbide barrier layer. The boride layer should be of a thickness adequate to cover completely the barrier layer and protect it from contact with evaporation products; I have found a thickness of about 10 microns to be necessary to achieve this protection.

The sintering conditions should be such as to produce coatings of adequate mechanical strength. The required strength will vary from one valve application to another, but it can be taken that a minimum requirement for hardness is that the coatings must be sufficiently hard to withstand all likely abrasions during manufacture and assembly of the valve and all electrical forces during processing operations. In some embodiments no great demands may be made on mechanical strength of the coatings and then it would be permissible to omit the high temperature sintering operations, protecting the surface coating with a temporary binder, and rely on the heat produced during normal valve processing operations to produce the required adhesion. In other cases adequate hardness of the coatings may be obtained by sintering both coatings in a single operation rather than individually.

The properties of the base metal of the grid are generally dictated by the temperature of operation of the grid. In valves using thoriated tungsten cathodes this normally involves the use of refractory metals such as molybdenum, tantalum or tungsten, niobium also being suitable, but for use with oxide coated cathodes other less refractory metals may be adopted.

The properties required of the barrier layer are that, in itself, it should be non-reactive with both base metal and boride coating, and should provide an effective barrier between the base metal and surface coating. Additionally it should be of adequate mechanical strength, as discussed above, it must be electrically conductive, have low vapour pressure, a high work function, a high melting point and thermal stability. At present zirconium carbide is preferred, but other carbides which could be used are those of titanium, vanadium, niobium, tantalum, chromium, tungsten, thorium, and uranium.

The properties quoted above for the barrier layer should apply also to the surface boride layer. There is the additional need that the boride should, in combination with evaporation products from the cathode, provide a surface of high work function. Again zirconium boride is presently preferred, but the borides of titanium and tantalum are alternatives.

For use with grids having as base metal either molybdenum or tantalum, the presently preferred manufacturing procedure is outlined in the example below.

EXAMPLE

The fabricated grid is cleaned chemically and then vacuum stoved at 1250° C. for 30 minutes. A spray mixture of zirconium carbide is made up from the following ingredients:

| | |
|---|---|
| Zirconium carbide _____ grams__ | 200 |
| 2.5% solution of nitrocellulose in ethyl carbonate _____ ml__ | 150 |
| Industrial methylated spirit _____ ml__ | 200 |

After stoving the grid is sprayed with the above mixture, then dried and sintered at 2000° C. for 20 minutes, the pressure in the oven being reduced to $5 \times 10^{-5}$ mm. Hg.

As stated previously I use a coating thickness of not less than 25 microns.

A zirconium boride spray mixture is made up as follows:

| | |
|---|---|
| Zirconium boride _____ grams__ | 200 |
| Ethyl carbonate _____ ml__ | 175 |
| Industrial methylated spirit _____ millilitres__ | 25 |
| 2.5% solution of nitrocellulose in ethyl carbonate _____ ml__ | 200 |

The mixture is ball-milled for 16 hours. The boride coating is sprayed on to the cathode barrier layer and after drying the grid is vacuum stoved at 1850° C. for 20 minutes, a coating of about 10 microns thickness of boride being achieved.

In test vehicles in which grids treated as specified in the above example were incorporated, after a thousand hours of operating life at a grid dissipation of 12 w./cm.$^2$, the grid emission was 2 a./cm.$^2$; comparable figures for grids coated with zirconium were 2 ma., and 200 ma. for platinum coated grids.

It is to be understood that the foregoing description of specific examples of this invention is made by way of example only and is not to be considered as a limitation on its scope.

What I claim is:

1. A grid for a thermionic valve comprising a metal base having a barrier layer of a metal carbide which does not react chemically with the base and a surface coating on said barrier layer of a metal boride having relatively high thermal stability; a low thermionic emission and which does not diffuse through the barrier layer during operation of the valve.

2. A method of manufacture of a grid for a thermionic valve including applying to a refractory metal base a first coating of carbon and a refractory metal applying a second coating of boron and a refractory metal over the first coating and sintering the first and second coatings at a relatively high temperature to provide a predetermined hardness and to bond mechanically one to another and to the metal base.

3. The method claimed in claim 2 wherein each coating is sintered separately to its underlying base.

4. A grid as claimed in claim 1 wherein the metal of the metal base is selected from the group consisting of molybdenum, tantalum, tungsten and niobium.

5. A grid according to claim 4 wherein the metal of the metal carbide is selected from the group consisting of zirconium, titanium, vanadium, niobium, chromium, tantalum, thorium and uranium.

6. A grid according to claim 5 wherein the metal of the surface coating is chosen from the group consisting of zirconium, titanium and tantalum.

7. The method according to claim 2 including coating the grid with a first barrier layer of zirconium carbide and a second surface layer of zirconium boride over the barrier layer, and sintering the barrier layer and the surface layer.

References Cited

UNITED STATES PATENTS

| 2,497,111 | 2/1950 | Williams | 313—107 |
| 2,769,114 | 10/1956 | Williams | 313—355 |
| 2,821,496 | 1/1958 | Perl | 313—107 X |

JOHN W. HUCKERT, Primary Examiner.

A. J. JAMES, Assistant Examiner.